United States Patent [19]

Ullstig

[11] 3,956,586

[45] May 11, 1976

[54] METHOD OF OPTICAL SCANNING

[75] Inventor: Stig Leopold Ullstig, Taby, Sweden

[73] Assignee: AGA Aktiebolag, Lidingo, Sweden

[22] Filed: Oct. 30, 1974

[21] Appl. No.: 519,234

[30] Foreign Application Priority Data
Nov. 1, 1973 Sweden............................ 7314855

[52] U.S. Cl................................. 178/7.6; 178/7.1;
178/DIG. 27; 178/DIG. 28; 250/236
[51] Int. Cl.²......................................... H04M 1/04
[58] Field of Search............... 178/7.6, 7.1, DIG. 27,
178/DIG. 28

[56] References Cited
UNITED STATES PATENTS

| | | | |
|---|---|---|---|
| 1,986,187 | 1/1935 | Dowsett............................... | 178/7.6 |
| 2,139,869 | 12/1938 | Traub.................................... | 178/7.6 |
| 3,765,743 | 10/1973 | Reaves,................................. | 178/7.6 |
| 3,845,298 | 10/1974 | Rumciman........................... | 178/7.6 |

Primary Examiner—Robert L. Griffin
Assistant Examiner—Edward L. Coles
Attorney, Agent, or Firm—Lerner, David, Littenberg & Samuel

[57] ABSTRACT

Several embodiments of an optical scanning system are disclosed which employ an accessible entrance pupil interposed between an image and a scanning device for isolating rays of light from the image without focusing the rays, thereby eliminating the aberrations associated with focusing. The disclosure shows the use of rotating mirrors spaced from the axis of rotation being employed for line scanning. A tilting mirror is also disclosed which converts the line scanners into complete image scanners.

9 Claims, 8 Drawing Figures

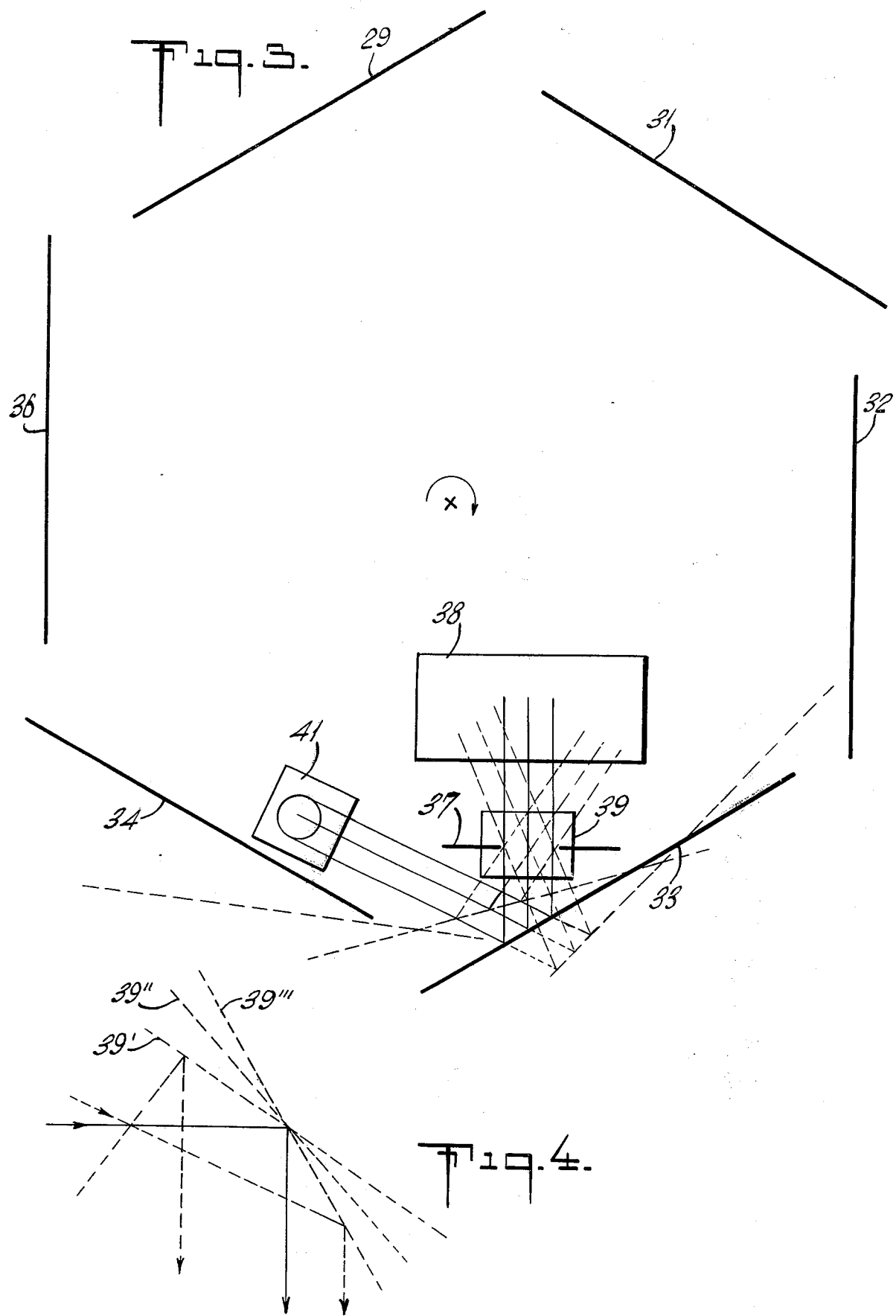

METHOD OF OPTICAL SCANNING

FIELD OF THE INVENTION

This invention relates to line scanners and particularly to line scanners employed for generating raster line pictures.

BACKGROUND OF THE INVENTION

Devices are known for scanning images to produce signals employable to drive a raster scan device. One such system is disclosed in U.S. Pat. No. 3,632,871 which issued Jan. 4, 1972, to Robert A. Watkins, et al., and is entitled "Optical Scanning Device." Systems such as the Watkin's device employ focusing lenses to provide focused images within the scanning device. The focusing lenses require precise location and relationship between the various optical lenses in order to accurately reproduce the image being scanned. In addition, the focusing lenses employed in systems such as Watkins, et al., introduce known aberrations because of the use thereof.

Another example of an optical scanner employing focusing lenses is U.S. Pat. No. 3,802,759, which issued Apr. 9, 1974, to Jens Karl-Olof Andersson and is entitled "Device for Optical-Mechanical Scanning of Images by Means of Corner Reflectors." This system suffers from the same disadvantages discussed with respect to the Watkins device.

Therefore, it is an object of this invention to provide a new and useful scanning system.

It is a further object of this invention to provide a new and useful scanning system which does not introduce errors normally associated with focusing systems.

BRIEF DESCRIPTION OF THE INVENTION

With these and other objects in view, the present invention comtemplates a system in which an entrance pupil appears on a first side thereof with an image to be scanned and a scanning device is mounted on the opposite side of the entrance pupil. The entrance pupil is defined as the area of a cross-section of the pencil of rays perpendicular to the principal ray in the point in space where the principal rays intersect each other.

In the preferred embodiment of the invention, a plurality of mirrors are mounted for rotation along a path around an axis of rotation and a refracting prism is also mounted for rotation inside said path. The preferred embodiment also includes a tilting mirror for shifting the line scan.

DESCRIPTION OF THE DRAWINGS

For a more complete understanding of the invention, reference should be made to the following detailed description and drawings, in which:

FIG. 3 is another embodiment, schematically shown, of the present invention.

FIG. 4 is the schematic showing of one preferred embodiment of the present invention.

The present invention relates to a system of scanning the image space having an entrance pupil which is physically accessible within the system. The general mode of operation for the type of scanning system utilized in the present invention is generally illustrated in FIG. 1. In FIG. 1, the field angle $\phi$, on the side of the entrance pupil 10, i.e., in the image space, is designated as $\phi$. The entrance pupil 10 has a diameter $\Phi$, defined as the diameter of the cross-section perpendicular to the principal ray. The radiation passing through the entrance pupil 10 is received on a scanner unit 12 which scans said radiation and sequentially transmits said radiation to a detector which consists of a lens system and a photodiode, or an infrared sensor, or the like. It can also include an aperture stop. The types of scanners which may be utilized in the present invention will be shown in the embodiments set forth in this specification. An afocal objective can be placed between an object and the scanner and preferably in the entrance pupil 10.

Great energy resolutions can be obtained utilizing the present invention. This is a consequence of the fact that the energy resolution of a scanning system $\Delta e$ is due to $\phi$ and $\Phi$ in the following manner in the case of unfocused radiation.

$$\Delta e \sim 1/(\Phi \, tg \, \phi)$$

Thus, by scanning with a large angle $\phi$, a small value of $\Delta e$ can be obtained when the value of $\Phi$ is small.

Image systems, even with an extremely wide angle, can easily be effected, which systems would reproduce plane objects without distortion.

Figure 1:
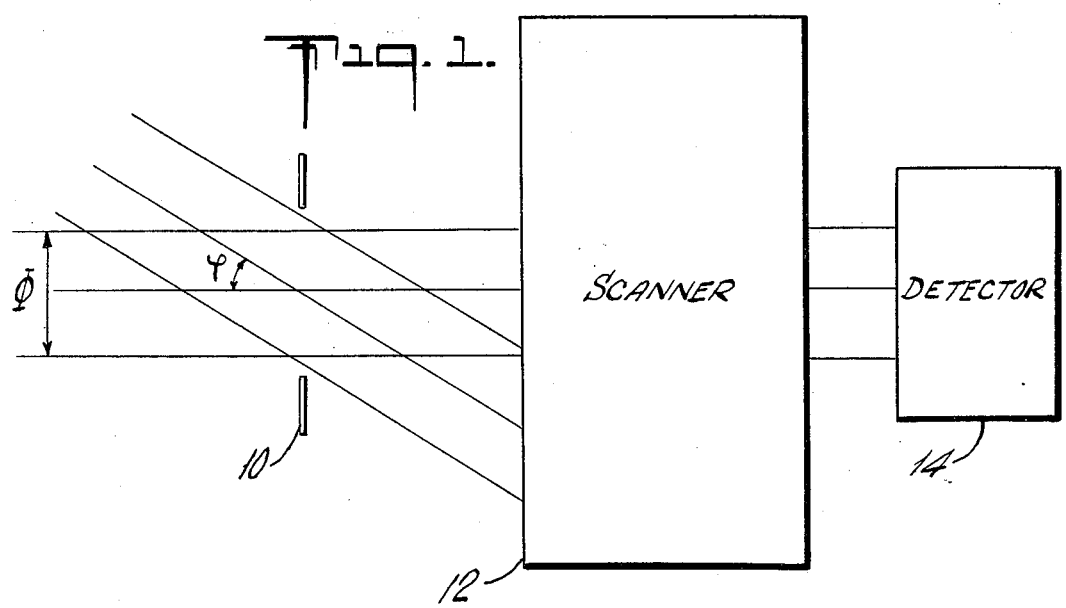
FIG. 1 is a schematic showing of the general type of scanning system of the present invention.
Figure 2:
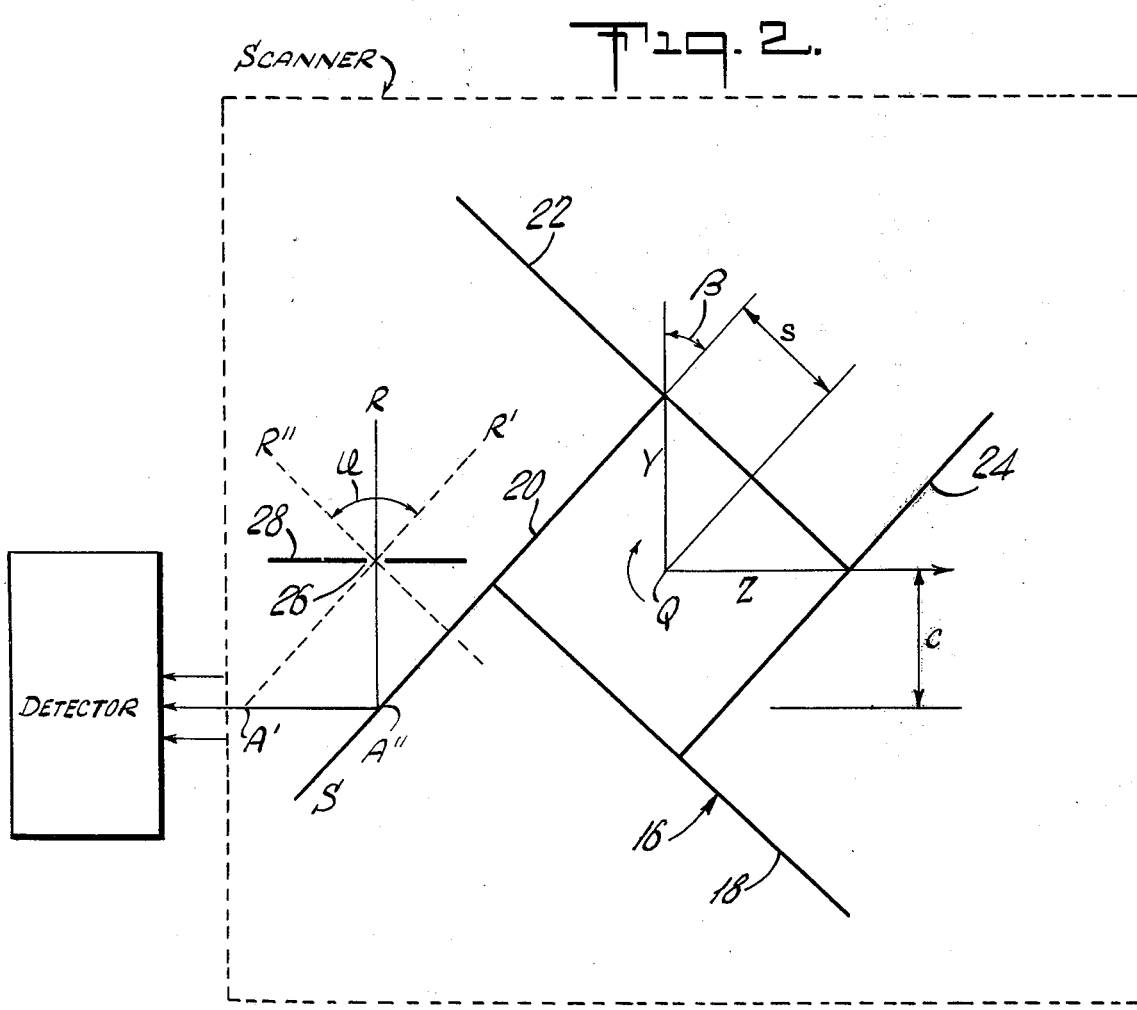
FIG. 2 is a schematic showing of one embodiment of the present invention.

The scanning system can be easily made free from aberrations as one has limited need for lenses in such a system. If an additional scanner, for instance, a tilting mirror, is placed adjacent the entrance pupil in a second dimension, it is possible to obtain a scanning system which is free from most aberrations. In FIG. 2, there is shown a scanning system utilizing a bladed mirror scanner. In FIG. 2, the blade scanner is generally designated by the numeral 16 and includes four mirrored surfaced, 18, 20, 22 and 24 which form part of a coordinate system having an origin Q at the center of rotation of the blade scanning unit 16. The distance $s$, i.e., the normal distance for each of the mirrors 18, 20, 22 and 24 from the axis Q is substantially equal. The number of mirrors utilized can be arbitrarily selected. The angle $\beta$ is the acute angle between the plane of a mirror and the Y-axis of the system. In the general case, a non-focused beam which is directed between the detector and the blade scanning means can be inclined by an angle of $\theta$ in relation to the Y-Z-plane. The X coordinate for the intersection between the X-Y-plane and the inclined ray is $b$. In FIG. 2, there are shown three different principal rays R, R' and R''. These rays are reflected at points A, A' and A'' respectively, as the mirror 20 rotates. The entrance pupil is shown at 26. An incident main beam om the detector may be defined as the vector:

$$r = \begin{pmatrix} b \\ -c \\ 0 \end{pmatrix} + t \begin{pmatrix} \sin \theta \\ 0 \\ \cos \theta \end{pmatrix} ; -\infty < t < \infty$$

It is hereby assumed that $b = \theta = 0$.

If the scan is effective for $\beta_o - \Delta \leq \beta \leq \beta_o + \Delta$ where $\beta_o$ is the angle of rotation defining the optical axis, it has been found that the ratio of $H = c/s$ is such that the marginal pupil aberration is fully compensated, i.e., the principal rays R, R' and R'' have an intersectional point in common where R defines the optical axis and R', R'' are marginal principal rays. The value of $H$ is determined by $$H = (2\ tg\ \beta_o \sin \beta_o + 2 \cos \beta_o - \cos (\beta_o + \Delta) - \cos (\beta_o - \Delta) - tg\ (\beta_o - \Delta) \sin (\beta_o - \Delta) - tg\ (\beta_o + \Delta) \sin (\beta_o + \Delta) - (\cos (\beta_o + \Delta) + tg\ (\beta_o + \Delta) \sin (\beta_o + \Delta) - \cos (\beta_o - \Delta) - tg\ (\beta_o - \Delta) \sin (\beta_o - \Delta))\ tg (2\ \beta_o)\ tg\ (-2\ \Delta))/((tg\ (\beta_o + \Delta) - tg\ (\beta_o - \Delta))\ tg (2\ \beta_o)\ tg\ (-2\ \Delta) + tg\ (\beta_o + \Delta) + tg\ (\beta_o - \Delta) - 2\ tg (\Delta))$$

By means of this formula it is easy to show that $H$ varies very little with $\Delta$ when $\beta_o$ is constant. From this follows that there are small variations of $H$ as a function of $\Delta$ when $\beta_o$ is constant showing that there are small pupil aberrations when the marginal pupil aberration is corrected.

FIG. 3 shows a slight variation of the blade scanner shown in FIG. 2. In the embodiment of FIG. 3, the blades 29, 31–34 and 36 are mounted for rotation (by means not shown) around the entrance pupil 37. Light from an objective 38 outside of the plane of the blades is deflected by a tilting mirror 39 towards the blades for sequential scanning. The blade mirrors (in this case blade mirror 33) deflects the light from the tilting mirror 39° to a 45° mirror 41 to effectuate line-by-line sequential scanning. The 45° mirror 41 deflects the light to a detection means (not shown) outside of the plane of the blade mirrors. In the embodiments of FIGS. 2 and 3 the basic line scanning is accomplished by a single mechanical movement. The second mechanical movement of the tilting mirror 39 produces a frame scan. In the embodiment to be described in FIGS. 4 and 5, the line scan is accomplished with two mechanical movements which, in a special case, can be reduced back to one. It should be noted that in the embodiment of FIG. 3 while six mirrors are employed, $\beta_o$ is 55°.

Figure 5:
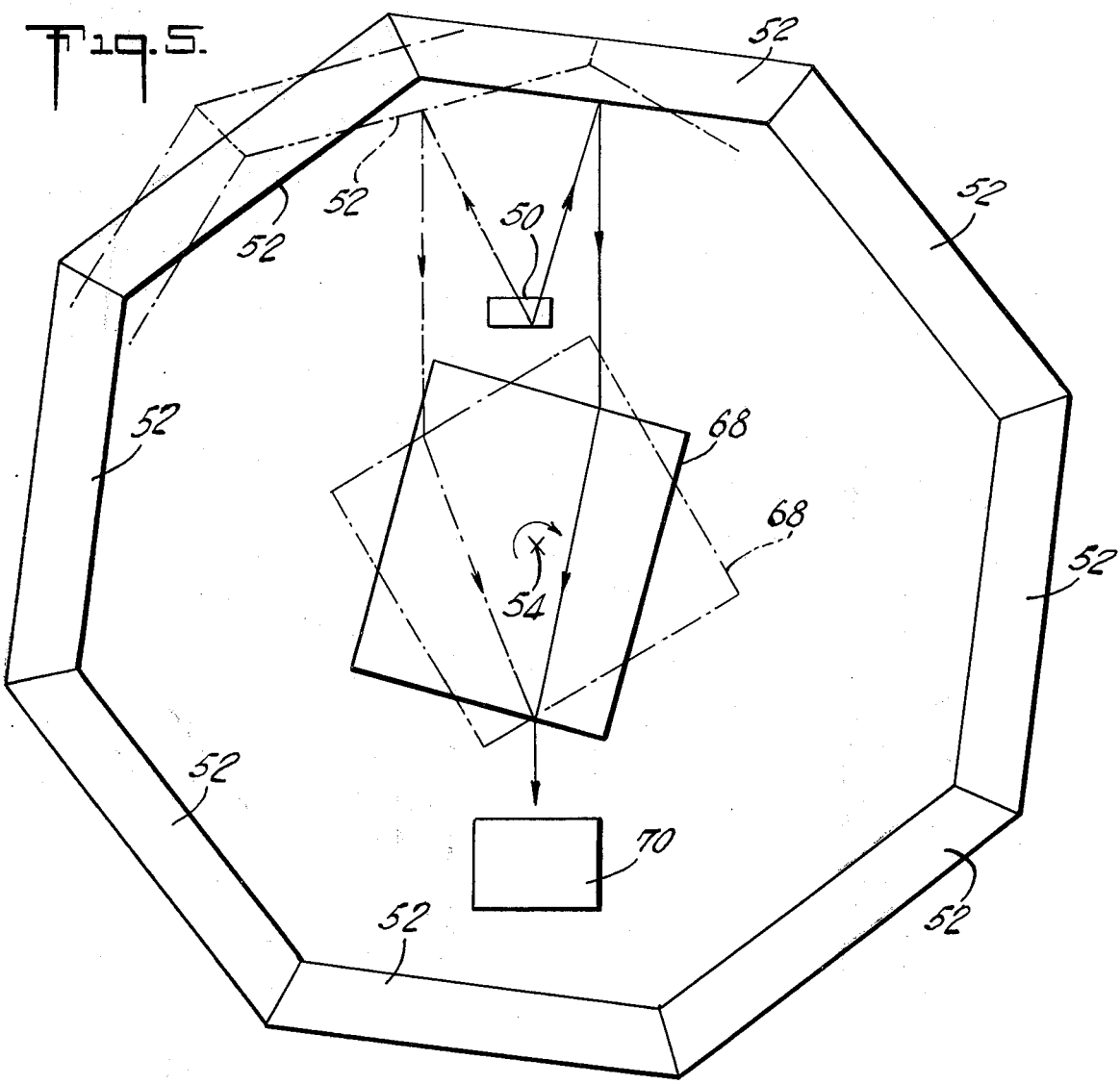
FIG. 5 is a side elevational view of the embodiment shown in FIG. 4.
Figure 6:
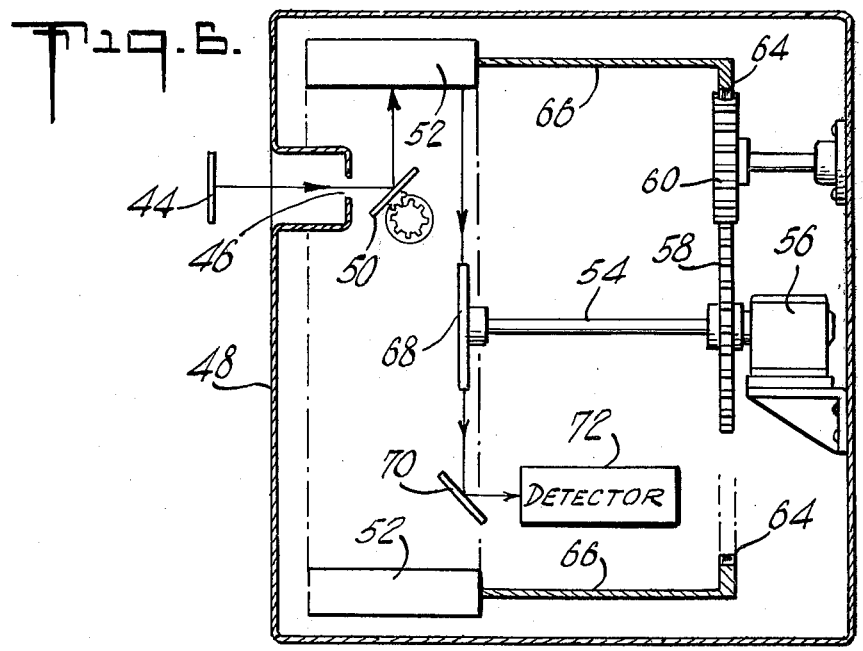
FIGS. 6 and 7 show in two dimensions a further embodiment of the invention.

In FIGS. 5 and 6, a preferred embodiment of the present invention is schematically shown. Rays from an image 44 pass through an opening 46 in a housing 48. The rays passing through opening 46 fall on a tilting mirror 50 which directs light up to rotatably mounted roof-edge prisms 52, which roof-edge prisms are mounted about a circular path having its axis at 54. The tilting mirror is preferably placed in the point in space where principal rays intersect, that is in the entrance pupil. The roof-edge prisms 52 are mounted upon a suitable rotatable drum driven by motor 56 and gears 58 and 60 which mesh with drive through gear teeth 64 the drum 66 on which are mounted the roof-edge prisms 52. The roof-edge prism 52 is operative to parallel displace the rays from the tilting mirror 50 and transmit them in the opposite direction and spaced from the entrance rays to the roof-edge prism 52. The roof-edge prisms can of course be replaced by mirrors. The rays from the roof-edge prism 52 are directed downwardly toward a driven prism 68. In the present embodiment, the prism 68 is shown with four sides, whereas there are eight roof-edge prisms 52. It is, therefore, necessary to rotate the prism 68 at twice the speed of the drum 66. If the prism 68 had eight sides, it would be driven at the same speed as the drum 66. These speed ratios are accomplished through the gear 60 and, the purpose of this arrangement is to drive the drum 66 and the prism 68 in synchronism. The prism 68 is transparent for the radiation and the rays incident thereon pass through the prism 68 to the 45° mirror 70 which then directs them onto the suitable detector 72. It should be noted that opposite surfaces of the prism are parallel in order to achieve proper deflection of the rays through the prism. The rotating drum 66 functions as a spherical mirror for the main beams received through the entrance pupil 50. The object of the rotating prism 68 is to direct the main beam in such a way that it will pass the focal point of the spherical mirror generated by the mirror unit. Therefore, the following relationships must exist:

$$f_s / f_p = n_s / n_p$$

$$t + d \sin (\eta \cdot \pi / n_s)/(\sin(\eta \cdot \pi / n_p) - tg(arcsin\ (sin(\eta \cdot \pi / n_p)/n \cos (\eta \cdot \pi / n_p))$$

where:
$f_s$ = rotation speed of the mirror system
$n_s$ = number of reflecting means in the mirror system
$n_p$ = number of sides of the prism
$f_p$ = rotation speed of the prism
$\eta$ = the scanning efficiency The maximum diameter $\Phi$, which is limited by vignetting in the prism is for a circular aperture $$\Phi = t(tg(\pi/n_p) \cos(\eta \cdot \pi / n_p) - \sin(\eta \cdot \pi / n_p)$$

Knowing that the energy resolution is $$e \sim 1/(\Phi\ tg(\phi)\ \sqrt{\eta})$$

it has been found that the cases which are of most practical interest are as follows:

I. $n_s = n_p = 4$
II. $n_s = n_p = 6$
III. $n_s = 8$ and $n_p = 4$

The plane of the principal rays between the mirror 70 and prisms 52 can be inclined so that it is not orthogonal to the rotation axis as in FIG. 5. This can be combined with the fact that the rotation axis of the prism 68 is inclined in a corresponding degree in relation to the rotation axis of the mirror unit 52. Hereby the rotation of a multiple detector is not necessary. Further it is not necessary to place the prism 68 in the middle of the drum 66. The device in FIG. 5 can be more compact if the prism 68 is displaced towards the upper prism 52 in the figure, followed by the mirror 70. This will enable the diameter of the drum 66 to be decreased.

Figure 7:
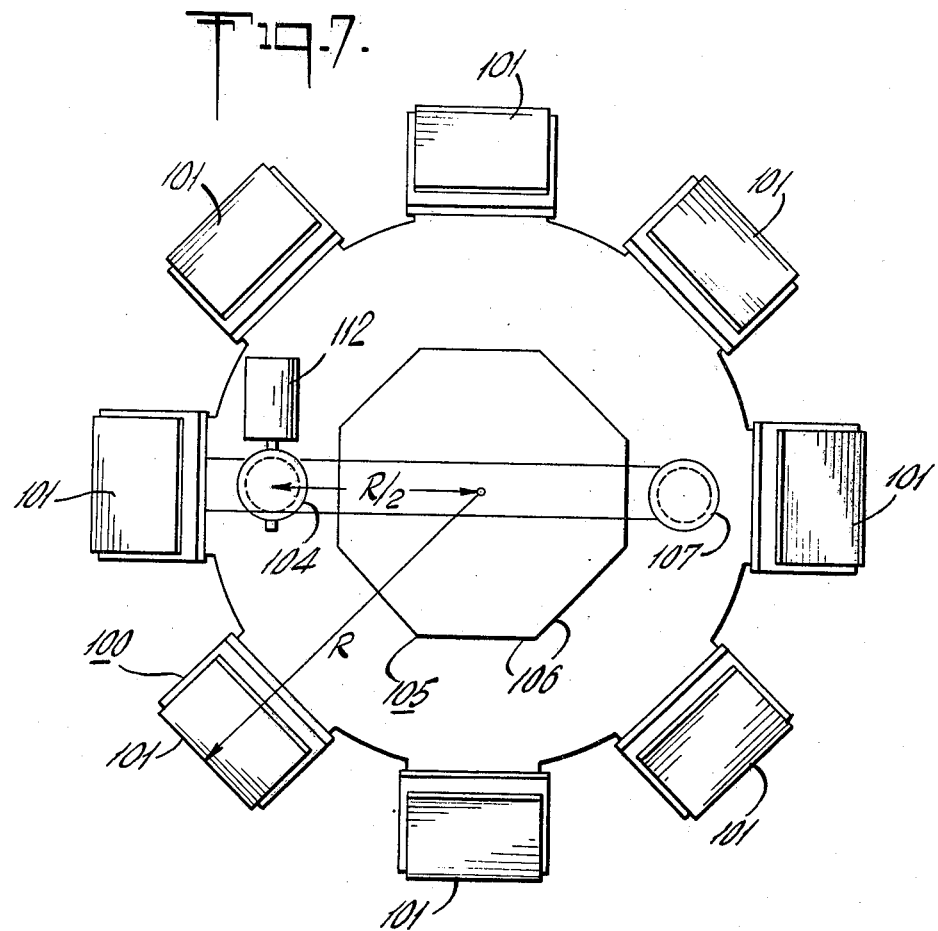
Figure 8:
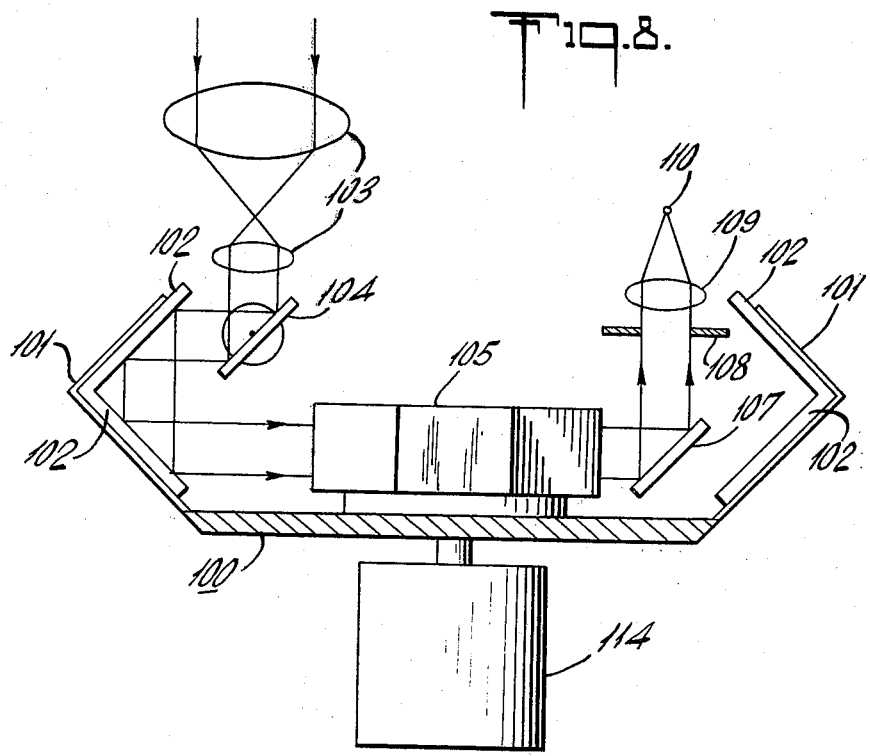

FIGS. 7 and 8 show a further embodiment of the invention differing only in detail from the device according to FIG. 5. FIG. 8 is a side view of the device in FIG. 7.

Mirrors 101 consisting of two perpendicular reflecting surfaces 102 are mounted on a drum 100. Rays from the object are falling through an afocal objective 103 on to a tilting mirror 104 driven by a motor 112. This mirror 104 is placed on the entrance pupil as defined above. From the mirror 104 the rays are deflected by the mirror 101 to return in the opposite direction but displaced in parallel. In this embodiment a refractive prism 105 has a number of sides 106 corresponding to the number of mirrors 101. Due to this fact the speed of rotation for the drum and the prism should coincide. The prism is in other words fixed to the drum and both these means are rotated by a motor 114.

A detector is to be placed on the other side of the prism 105. If there is not space, a 45° deflecting mirror 107 can deflect the rays through an aperture stop 108 and a converging lens system 109 onto a detector means 110. As can be seen from FIG. 7, the mirrors 101 can be spaced from one another because of the fact that only a small area of each mirror near the normal to the rotational axis is used for the deflection.

If an odd number of mirrors 101 is used in the device according to FIG. 7, the detector could be placed outside the drum behind the mirror 101 nearest to the mirror 107 in the figure. Because when a mirror is in the place like the mirror 101 nearest to the mirror 104 in the figure, no mirror 101 is placed opposite to this in that moment. The deflecting mirror 107 can hereby be eliminated.

It should be noted that, since the embodiments discussed above have been accomplished without the necessity for focusing radiation, it is possible to build the units without the need for precise spacing which was necessary in prior art devices such as Watkins discussed previously.

Although this invention has been described with respect to its preferred embodiment, it should be understood that many variations and modifications will now be obvious to those skilled in the art, and it is preferred, therefore, that the scope of the invention be limited, not by the specific disclosure herein.

I claim as my invention:

1. An optical scanning device comprising detector means for afocal scanning of an object, said detector means including a plurality of mirrored surfaces mounted in a circular path and directed inwardly for rotation about a fixed axis for angular deflection of a substantially parallel ray path, a radiation deflecting means positioned in the parallel ray path between the mirrored surfaces and the detector means and mounted for synchronous rotation with said mirrors to direct radiation onto said detector means, said detector means having an accessible substantially fixed entrance pupil on the object side thereof.

2. The optical scanning device of claim 1, wherein said mirrors on said circular path are roof-edge prisms.

3. The optical scanning device of claim 1, wherein said mirrors on said circular path are two reflecting surfaces perpendicular to each other.

4. The optical scanning device of claim 1, wherein said radiation deflecting means is a polygonal cylinder prism with mutually parallel reflecting surfaces, the angular velocity of said radiation defelction means following the following equation:

$$f_s/f_p = n_s/n_p;$$

where
$f_s$ is the angular velocity of the mirrored surfaces and $n_s$ is the number of mirrored surfaces and $n_p$ is the number of surfaces of the prism.

5. The optical scanning device of claim 1, wherein said rotating radiation deflection means is a rotating refractive prism.

6. The optical scanning device according to claim 1, wherein an optical means is positioned in said entrance pupil.

7. The optical scanning device of claim 5, wherein said radiation reflecting mirrors on said optical path are roof-edge prisms.

8. The optical scanning device according to claim 6, wherein said optical means in the entrance pupil is an objective.

9. The optical scanning device of claim 6, wherein said optical means in the entrance pupil is a tilting mirror.

* * * * *

UNITED STATES PATENT OFFICE
CERTIFICATE OF CORRECTION

Patent No. 3,956,586          Dated May 11, 1976

Inventor(s)    STIG LEOPOLD ULLSTIG

It is certified that error appears in the above-identified patent and that said Letters Patent are hereby corrected as shown below:

Column 1, insert a new paragraph after Line 63:
"FIG. 4 is a graphic showing of a frame scan
of the device of Fig. 3."

Column 1, Line 63, delete "4" and insert therefor: -- 5 --.

Column 1, Line 65, delete "5" and insert therefor: -- 6 --.

Column 1, Line 66, delete "4" and insert therefor: -- 5 --.

Column 1, Line 67, delete "6 and 7" and insert therefor:
-- 7 and 8 --.

Column 3, Line 38, delete "4 and 5" and insert therefor"
-- 5 and 6 -- .

Column 3, Line 37, after "scan" and before "." insert:
-- as shown in FIG. 4 -- .

UNITED STATES PATENT OFFICE
CERTIFICATE OF CORRECTION

Patent No. 3,956,586      Dated May 11, 1976

Inventor(s) STIG LEOPOLD ULLSTIG

It is certified that error appears in the above-identified patent and that said Letters Patent are hereby corrected as shown below:

Claim 4, line 3, "reflecting" should read: -- refractive --.

Claim 4, line 20, after "mirrored surfaces" insert: -- and $f_p$ is the rotation speed of the prism -- .

Signed and Sealed this

Thirty-first Day of August 1976

[SEAL]

Attest:

RUTH C. MASON
*Attesting Officer*

C. MARSHALL DANN
*Commissioner of Patents and Trademarks*